(12) United States Patent
Dubray et al.

(10) Patent No.: US 12,510,398 B2
(45) Date of Patent: Dec. 30, 2025

(54) MEASURING DEVICE AND METHOD OF OPERATING A MEASURING DEVICE

(71) Applicant: KROHNE S.A.S., Romans-sur-Isère (FR)

(72) Inventors: Olivier Dubray, Chatuzange-le-Goubet (FR); Denis Graillat, Mours Saint Eusèbe (FR); Denis Lambert, Saint Bardoux (FR)

( * ) Notice: Subject to any disclaimer, the term of this patent is extended or adjusted under 35 U.S.C. 154(b) by 399 days.

(21) Appl. No.: 18/450,066

(22) Filed: Aug. 15, 2023

(65) Prior Publication Data

US 2024/0053186 A1 Feb. 15, 2024

(30) Foreign Application Priority Data

Aug. 15, 2022 (DE) ...................... 10 2022 120 513.4

(51) Int. Cl.
*G01F 23/284* (2006.01)
(52) U.S. Cl.
CPC .................................. *G01F 23/284* (2013.01)
(58) Field of Classification Search
CPC . G01F 23/284; G01R 21/133; G01R 19/0092; G01R 1/02; G01R 1/0408;
(Continued)

(56) References Cited

U.S. PATENT DOCUMENTS 5,751,908 A 5/1998 Madau et al.
6,014,021 A * 1/2000 Le Van Suu ......... G01R 21/133
324/74

(Continued)

FOREIGN PATENT DOCUMENTS

DE 10 2005 063 054 A1 7/2007
DE 10 2007 047 309 A1 4/2009
WO 2021/004753 A1 1/2021

OTHER PUBLICATIONS

J. Rodway and P. Musilek, "Wireless sensor networks with pressure-based energy forecasting: A simulation study," 2016 IEEE Canadian Conference on Electrical and Computer Engineering (CCECE), Vancouver, BC, Canada, 2016, pp. 1-4, doi: 10.1109/CCECE.2016. 7726794.

*Primary Examiner* — William Kelleher
*Assistant Examiner* — Ismaaeel A. Siddiquee
(74) *Attorney, Agent, or Firm* — Patrick D. Duplessis

(57) ABSTRACT

A method for operating a measuring device includes: storing a voltage membership function; assigning a voltage membership degree to a voltage fuzzy set of sufficient buffer voltages; storing an operating parameter membership function; assigning an operating parameter membership degree to an operating parameter fuzzy set of sufficient operating parameter values; determining an operating parameter value and measuring a first buffer voltage at a first time; executing a fuzzy algorithm that involves determining the voltage membership degree of the first buffer voltage using the voltage membership function, determining the operating parameter membership degree of the operating parameter value using the operating parameter membership function, and determining a result membership degree by combining the voltage membership degree and the operating parameter membership degree; and determining a further method step which requires no more than an available energy for a duration of an execution of the method step.

16 Claims, 4 Drawing Sheets

(58) Field of Classification Search
CPC .......... G01R 31/00; G01S 13/88; G06N 7/02; G08C 19/02; H04L 67/12; H04W 4/38; G01D 21/00
See application file for complete search history.

(56) References Cited

U.S. PATENT DOCUMENTS

| | | | |
|---|---|---|---|
| 6,119,529 A * | 9/2000 | Di Marco | G01F 1/696 73/204.27 |
| 2006/0290328 A1 | 12/2006 | Orth | |
| 2013/0135110 A1 * | 5/2013 | Xie | G08B 29/181 340/636.11 |
| 2017/0170659 A1 | 6/2017 | Kech et al. | |

* cited by examiner

MEASURING DEVICE AND METHOD OF OPERATING A MEASURING DEVICE

TECHNICAL FIELD

The invention relates to a method for operating a measuring device. The measuring device, on the one hand, has a supply device with a buffer storage and, on the other hand, as loads, a current loop interface, a controller and a measuring unit. The current loop interface is connected to a current loop and is designed for communication via the current loop. The supply device is supplied with energy from the current loop and the loads are supplied with energy from the supply device using the buffer storage.

The invention also relates to a measuring device with a supply device with a buffer storage and, as loads, a current loop interface, a measuring unit and a controller. The current loop interface is designed for connection to a current loop and for communication via the current loop. The supply device is designed for being supplied with energy from the current loop and for supplying energy to the loads using the buffer storage.

The supply device thus has the buffer storage and is designed to supply the loads with energy using the buffer storage. The loads are, in particular, the current loop interface, the measuring unit and the controller. During operation of the measuring device, the supply device supplies the loads with energy, which the supply device takes from the current loop. The buffer storage is designed for the intermediate storage of energy. Here, energy always means electrical energy.

Power that is usually variable over time can be taken from the current loop. If at any time, the power that can be taken from the current loop is less than the power required by the measuring device, then the loads are supplied with energy at least partially from the buffer storage as long as there is sufficient energy in the buffer storage. If at any time, the power that can be taken from the current loop is greater than the power required by the measuring device, then the buffer storage is recharged.

The power required by the measuring device depends largely on a method step performed by the measuring device. One method step is, for example, a measurement carried out by the measuring unit or a communication carried out by the current loop interface. Method steps are controlled by the controller. A method step requires a determined amount of energy to be carried out and a corresponding power over a duration of execution.

Execution of a method step by the measuring device, which requires more energy than can be taken from the current loop and the buffer storage during a duration of execution, means an undersupply of the measuring device with energy, whereby an operational reliability of the measuring device is not guaranteed.

SUMMARY

The object of the present invention is therefore to provide a measuring device and a method for operating a measuring device, in which further method steps executable by the measuring device are determined, which do not require more than an available energy for a duration of the execution.

The object is achieved, on the one hand, by a method for operating a measuring device having the features of claim 1. According to the method, a voltage membership function is stored in the controller, which assigns a buffer voltage of the buffer storage a voltage membership degree to a voltage fuzzy set of is sufficient buffer voltages. Further, at least one operating parameter membership function is stored in the controller, which assigns an operating parameter value of the measuring device an operating parameter membership degree to an operating parameter fuzzy set of sufficient operating parameter values.

Further, at least one operating parameter value is determined by the controller and a first buffer voltage is measured at a first time.

Then, a fuzzy algorithm having the following method steps is executed by the controller:

In a first method step, the voltage membership degree of the first buffer voltage using the voltage membership function is determined.

In a second method step, the at least one operating parameter membership degree of the at least one operating parameter value using the at least one operating parameter membership function is determined.

In a third method step, a result membership degree is determined by combining the voltage membership degree and the operating parameter membership degree with each other.

Then, a further method step which can be executed by the measuring device and which requires no more than an available energy for a duration of an execution of the method step is determined by the controller using the result membership degree.

The voltage membership function, the at least one further operating parameter membership function and the combination are determined in such a way that they are a measure of the available energy. Furthermore, information about an energy requirement of further method steps is stored in the controller.

The method according to the invention has the advantage that a method step that can be carried out by the measuring instrument is determined dynamically, which does not require more than one available energy for a duration of an execution. This improves the operational reliability of the measuring instrument.

At least one operating parameter membership function is stored in the controller, and this at least one operating parameter membership function is used by the controller. Several of these operating parameter membership functions and their use in the method are described below.

In one design of the method, the at least one further operating parameter membership function is a current membership function. This function assigns a loop current of the current loop a current membership degree to a current fuzzy set of sufficient loop currents. A loop current is determined by the controller at the first time as the operating parameter value.

In a further design, the at least one further operating parameter membership function is a time-distance membership function. This function assigns a time distance a time-distance membership degree to a time-distance fuzzy set of sufficient time distances. A method step is carried out by the measuring device ending at an execution time before the first time. In this method step, for example, a communication is carried out by the current interface or a measurement is made by the measuring unit. Further, a time distance between the first time and the execution time is determined by the controller as the operating parameter value. In an alternative, a method step is carried out by the measuring device starting at an execution time before the first time. In this case, the execution of the method step is preferably completed before the first time.

In a further design, the at least one further operating parameter membership function is a voltage slope membership function. This function assigns a voltage slope a voltage slope membership degree to a voltage slope fuzzy set of sufficient voltage slopes. Further, a second buffer voltage at a second time is determined by the controller and a voltage slope between the first time and the second time is determined from the first buffer voltage and from the second buffer voltage as the operating parameter value. The voltage slope is determined from a voltage difference between the first and second buffer voltages and from a time difference between the first and second times. The second time and the execution time can coincide. Usually, the second time is temporally before the first time.

In a further design, the at least one further operating parameter membership function is a current slope membership function. This function assigns a current slope a current slope membership degree to a current slope fuzzy set of sufficient current slopes. Further, a first loop current at the first time and a second loop current at a second time is determined by the controller and a current slope between the first time and the second time is determined from the first loop current and from the second loop current as the operating parameter value. The current slope is determined from a current difference between the first and second loop currents and from a time difference between the first and second times.

A loop current, in particular the first and the second loop current, is determined by measuring it or by reading a set current. The measuring or the reading is carried out, for example, by the controller. The set current is, for example, specified by the controller of the current loop interface and is stored in the controller so that it can be read.

In a further design, the combining of the voltage membership degree and the at least one operating parameter membership degree comprises at least one multiplication.

Membership functions such as those previously mentioned assign a membership degree to a parameter value in a fuzzy set of sufficient parameter values. A membership degree basically has a value between 0 and 1. Parameter values are the buffer voltage and the listed operating parameter values. An operating parameter is a parameter of the measuring device which describes an operating condition of the measuring device. Consequently, the buffer voltage, loop current, time distance, voltage slope and current slope are operating parameters.

In one set of methods, two operating parameter values are always determined, and one of the two operating parameter values is always the buffer voltage.

The other operating parameter value is either the loop current or the time distance or the voltage slope or the current slope.

In a preferred design of this group of methods, the voltage slope membership function is stored in the controller as the at least one operating parameter membership function. It assigns the voltage slope the voltage slope membership degree to the voltage slope fuzzy set. Here, the voltage slope is the operating parameter value, the voltage slope membership degree is the operating parameter membership degree, and the voltage slope fuzzy set is the operating parameter fuzzy set.

Accordingly, the controller determines the voltage slope and the voltage slope membership degree using the voltage slope membership function, and then determines the result membership degree by combining the voltage membership degree and the voltage slope membership degree.

To increase an accuracy of the determination of the executable method steps, which do not require more than one available energy for a duration of one execution, more than two operating parameter values are determined and their membership degrees are combined in another group of methods.

In a preferred design of these methods, the controller stores, on the one hand, the current membership function and, on the other hand, the current slope membership function as the operating parameter membership functions.

Accordingly, the controller determines the loop current and the current slope, then determines the current membership degree and the current slope membership degree, and further determines the result membership degree by combining the voltage membership degree, the current membership degree, and the current slope membership degree with one another.

In all methods, the controller determines another method step that can be carried out by the measuring device using the result membership degree. For this, it is provided in a further design that, in respect to the controller, if the result membership degree is greater than a first limit value, the further method step is a measurement or diagnostic or consuming algorithm executable by the measuring unit, and that, if the result membership degree is less than the first limit value and greater than a second limit value, the further method step is a communication executable by the current loop interface.

The result membership degree usually has a value between 0 and 1. The value corresponds to the available energy, with a higher value representing a greater available energy than a lower value. Since a measurement executable by the measurement unit usually requires more energy than a communication executable by the current loop interface via the current loop interface, the first limit value and the second limit value are dimensioned accordingly and stored in the controller.

In a further design, when the result membership degree is 0, the further method step is a zero step. The zero step means that no further method step is carried out by the measuring device and, in particular, by the controller, since no sufficient energy is available for such a step.

The object is also achieved by a measuring device with the features of claim 11. The measuring device is characterized in that a voltage membership function and at least one operation parameter membership function are stored in the controller. The voltage membership function assigns a buffer voltage of the buffer storage a voltage membership degree to a voltage fuzzy set of sufficient buffer voltages. The operating parameter membership function assigns an operating parameter value of the measuring device an operating parameter membership degree to an operating parameter fuzzy set of sufficient operating parameter values.

Further, the controller is designed to determine at least one operating parameter value and to measure a first buffer voltage at a first time.

Furthermore, the controller is designed to carry out a fuzzy algorithm having the following method steps:

In a first method step, the voltage membership degree of the first buffer voltage is determined using the voltage membership function.

In a second method step, the at least one operating parameter membership degree of the at least one operating parameter value is determined using the at least one operating parameter membership function.

In a third method step, a result membership degree is determined by combining the voltage membership degree and the at least one operating parameter membership degree with each other.

Further, using the result membership degree, the controller is designed to determine a further method step which can be executed by the measuring device and which requires no more than an available energy for a duration of an execution of the method step.

In one design of the measuring device, the measuring device, in particular the controller, is designed to carry out any one of the methods described above.

In one design, the current loop interface is designed for communication according to a 4 mA to 20 mA standard via the current loop. In this standard, information is represented by an absolute value of loop current in the current loop. Information is, for example, a measured value measured by the measuring unit. However, this also means that the power that can be drawn from the current loop depends on the information transmitted via the current loop. The method and measuring device described are therefore particularly suitable for combination with this standard. Then, the use of the current membership degree in determining the result membership degree is also particularly advantageous.

In a further design of the measuring device, the current loop interface is designed for communication according to a digital bus protocol via the current is loop and/or a Bluetooth standard via an additional transceiver in the current loop interface. This bus protocol is, for example, a HART standard. If the current loop interface is designed for communication according to a Bluetooth standard via an additional transceiver, then the transceiver is either a part of the current loop interface or separate from it.

In a further design, the buffer storage is a capacitor.

In a further design, the measuring device is a fill level measuring device, preferably a radar fill level measuring device.

In all other respects, the remarks about the method apply accordingly to the measuring device and vice versa.

BRIEF DESCRIPTION OF THE DRAWINGS

In detail, there is a plurality of possibilities for designing and further developing the method for operating a measuring device and the measuring device. For this, reference is made to the following description of a preferred embodiment in connection with the drawings.

DETAILED DESCRIPTION

Figure 1:
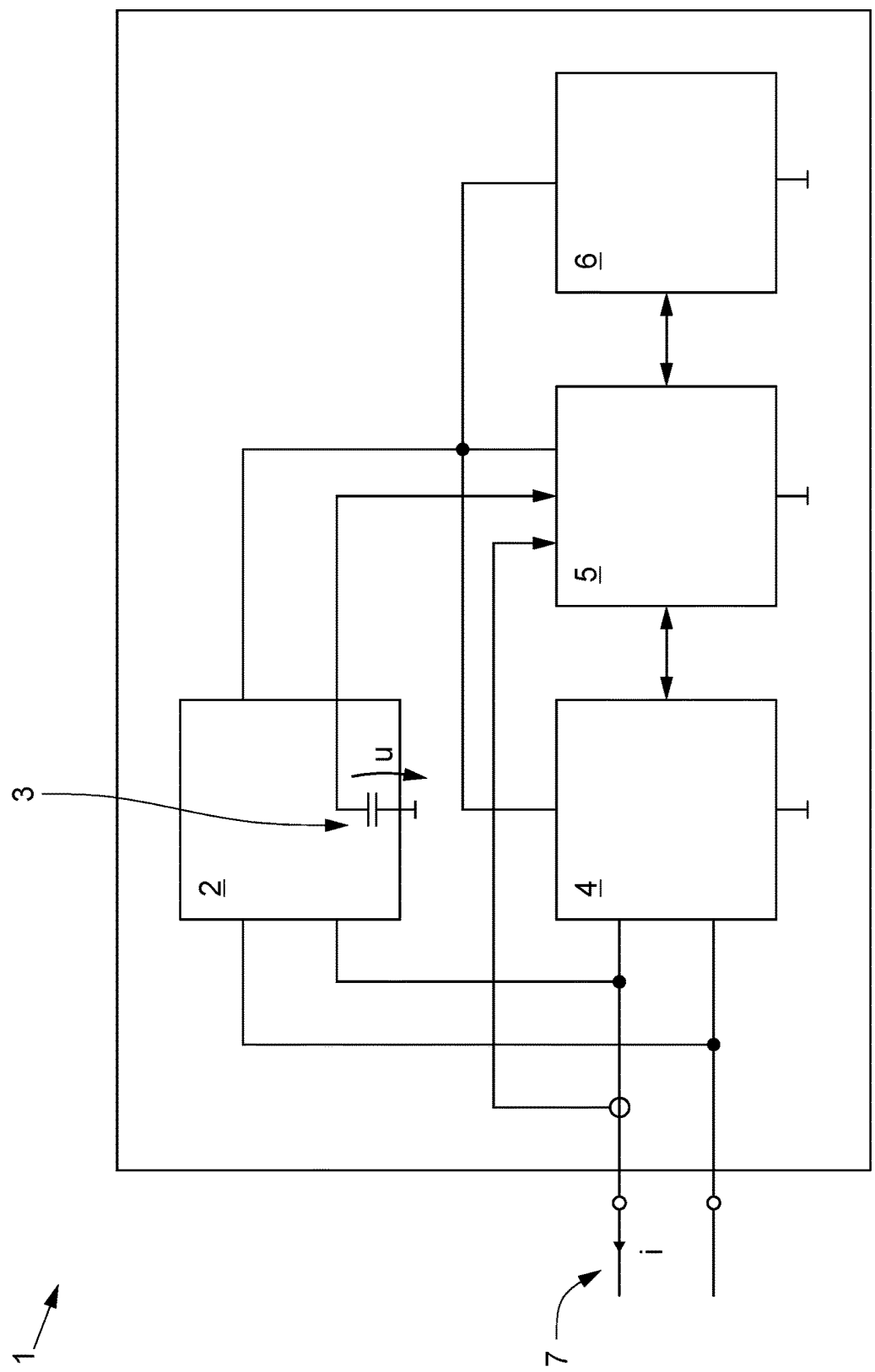
FIG. 1 illustrates an embodiment of a measuring device.

FIG. 1 shows essential elements of an embodiment of a measuring device 1 in an abstracted view. The measuring device 1 has, as essential elements, a supply device 2 with a buffer storage 3 and, as loads, a current loop interface 4, a controller 5 and a measuring unit 6. The buffer storage 3 is a capacitor. In this embodiment, the measuring device 1 is a radar fill level measuring device. Accordingly, the measuring unit 6 is designed to determine a fill level of a medium by means of radar.

The current loop interface 4 is designed for connection to a current loop 7 and for communication via the current loop 7. In the present embodiment, the current loop interface 4 is connected to the current loop 7 and is designed for communication according to a 4 mA to 20 mA standard via the current loop 7. During operation of the measuring device 1, for example, measured values determined by the measuring unit 6 are transmitted according to this standard.

The supply device 2 is designed to be supplied with energy from the current loop 7 and to supply energy to the loads, i.e. in particular the current loop interface 4, the controller 5 and the measuring unit 6, using the buffer storage 3. For supplying the supply device 2 with energy from the current loop 7, the supply device 2 is connected to the current loop 7. For supplying energy to the loads by the supply device 2, the supply device 2 is respectively connected to the current loop interface 4, the controller 5 and the measuring unit 6.

The measuring device 1 is in operation, which is why the supply device 2 is supplied with energy from the current loop 7 and the loads are supplied with energy from the supply device 2 using the buffer storage 3.

Figure 2A:
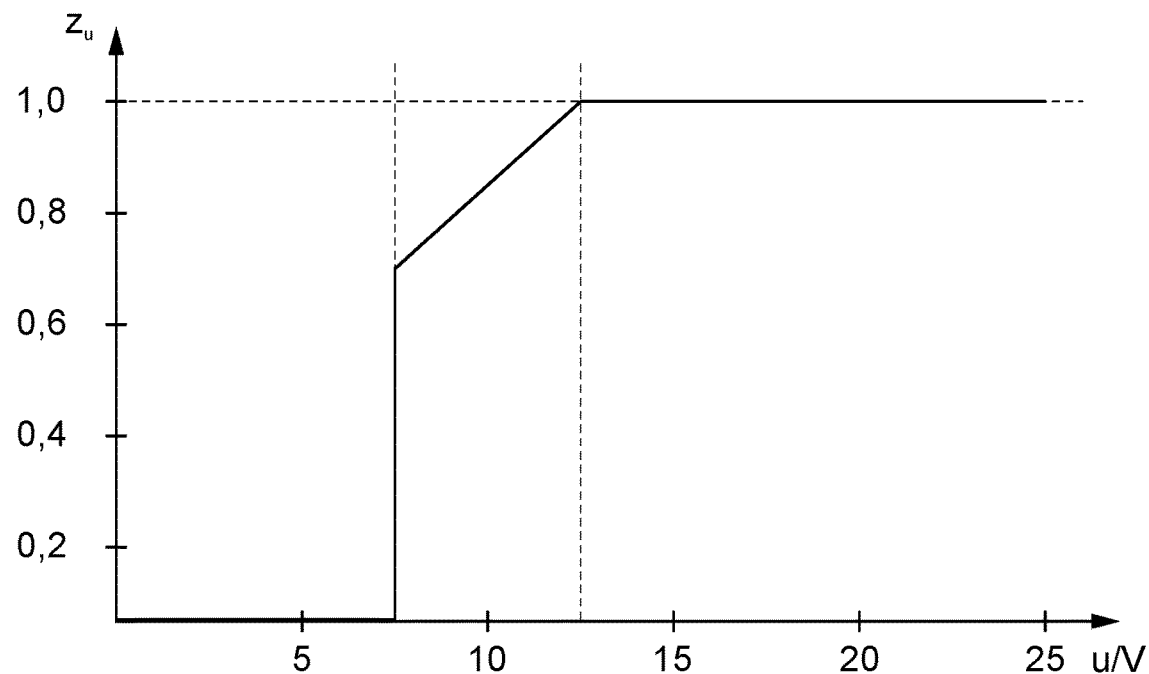
FIG. 2a illustrates an embodiment of a voltage membership function.
Figure 2B:
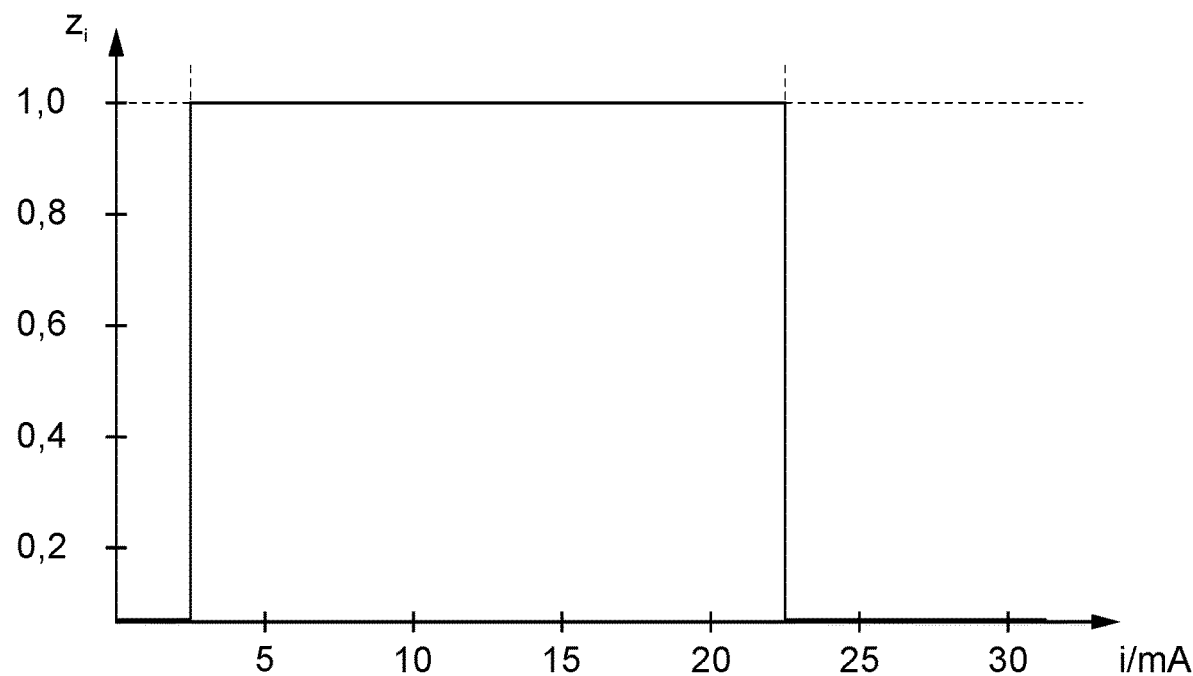
FIG. 2b illustrates an embodiment of a current membership function.
Figure 2C:
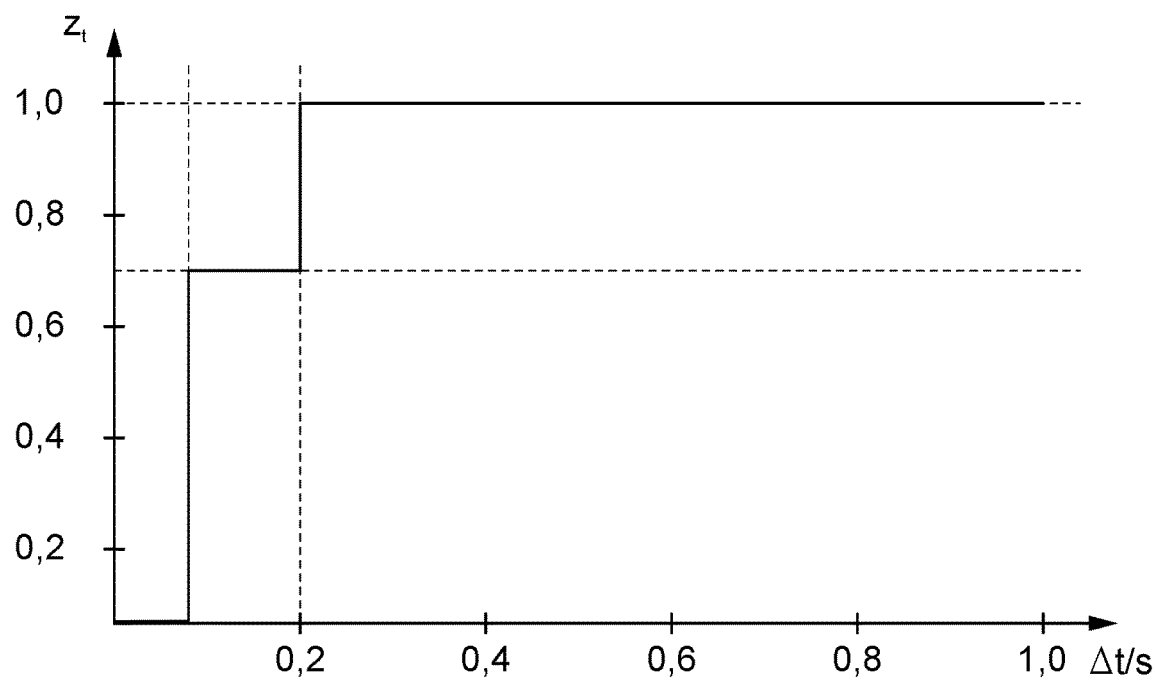
FIG. 2c illustrates an embodiment of a time distance membership function.
Figure 2D:
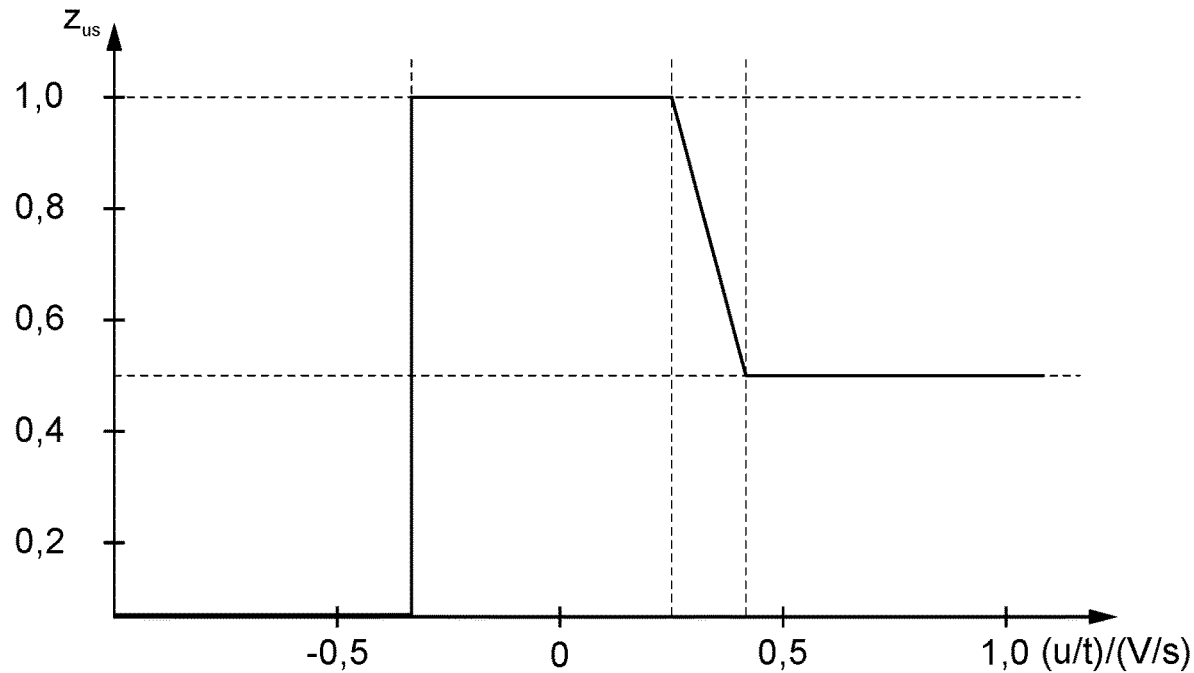
FIG. 2d illustrates an embodiment of a voltage slope membership function.
Figure 2E:
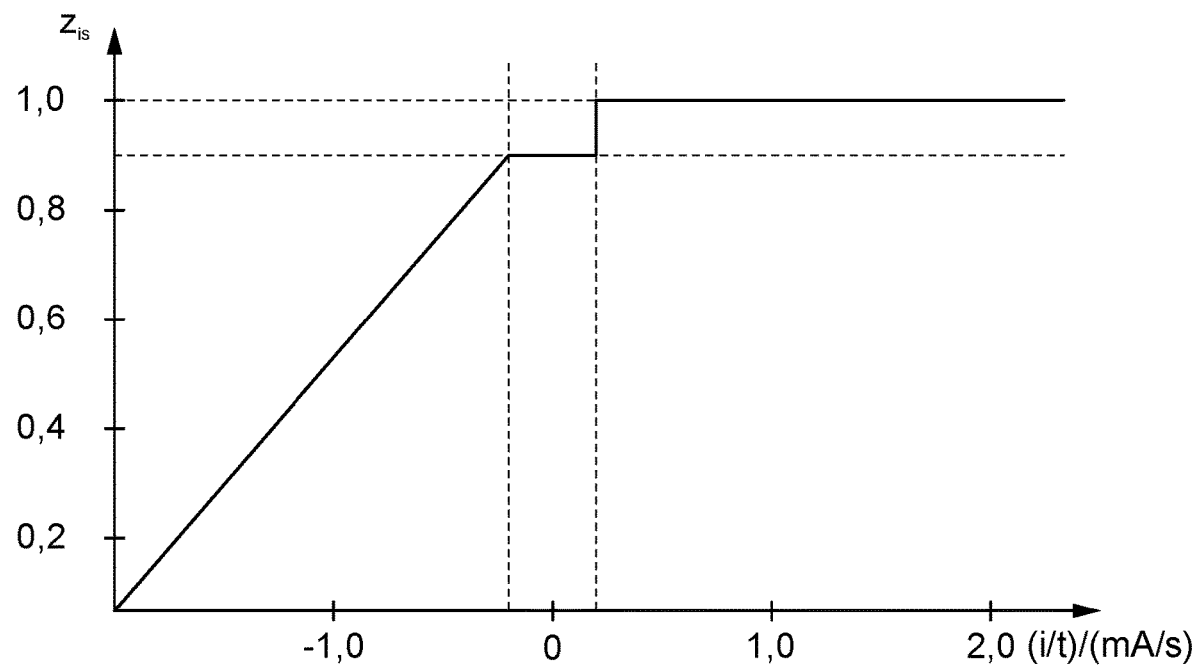
FIG. 2e illustrates an embodiment of a current slope membership function.

In the controller 5, a voltage membership function, see FIG. 2a, a current membership function, see FIG. 2b, a time distance membership function, see FIG. 2c, and a voltage slope membership function, see FIG. 2d, are stored as operating parameter membership functions. As an alternative to one of the aforementioned or in addition to the aforementioned operating parameter membership functions, a current slope membership function, see FIG. 2e, can also be stored in the controller 5. In detail, the following applies to the listed operating parameter membership functions:

The voltage membership function assigns a buffer voltage u of the buffer storage 3 a voltage membership degree $Z_u$ to a voltage fuzzy set of sufficient buffer voltages. $Z_u$ is 0 for buffer voltages u less than 7.5 V, and 1 for buffer voltages u greater than 12.5 V. $Z_u$ increases linearly from 0.7 to 1 for buffer voltages u in the range between 7.5 V and 12.5 V.

The current membership function assigns a loop current i of current loop 7 a current membership degree $Z_i$ to a current fuzzy set of sufficient loop currents. $Z_i$ is 0 for loop currents i less than 2.5 mA and greater than 22.5 mA. $Z_i$ is 1 for loop currents i in the range between 2.5 mA and 22.5 mA.

The time distance membership function assigns a time distance $\Delta t$ a time distance membership degree $Z_t$ to a time distance fuzzy set of sufficient time distances $\Delta t$. $Z_t$ is 0 for time distance $\Delta t$ less than 0.08 s, is 0.7 for time distance $\Delta t$ in the range between 0.08 s and 0.2 s, and is 1 for time distances $\Delta t$ greater than 0.2 s.

The voltage slope membership function assigns a voltage slope u/t a voltage slope membership degree $Z_{us}$ to a voltage slope fuzzy set of sufficient voltage slopes. $Z_{us}$ is 0 for voltage slopes u/t less than −0.4 V/s and is 1 for voltage slopes u/t in the range between −0.4 V/s and 0.25 V/s. $Z_{us}$ is 0.5 for voltage slopes u/t greater than 0.4 V/s and decreases linearly from 1 to 0.5 for voltage slopes u/t in the range greater than 0.25 V/s and less than or equal to 0.4 V/s. Thus, charging and discharging with an absolute slope of 0.4 V/s has no negative effect.

The current slope membership function assigns a current slope i/t a current slope membership degree $Z_{is}$ to a current slope fuzzy set of sufficient current slopes. $Z_{is}$ is 0 for current slopes i/t less than −2 mA/s and is 1 for current slopes i/t greater than 0.2 mA/s. $Z_{is}$ increases linearly from 0 to 0.9 for current slopes i/t in the range from −2 mA/s to −0.2 mA/s and is constant in the range greater than −0.2 mA/s and less than or equal to 0.2 mA/s.

The progressions of the membership functions in FIGS. 2a to 2e are typical progressions that have proven themselves in practice. The progressions apply qualitatively, i.e., independently of the specified values.

The controller 5 is designed to determine the operating parameter values of the operating parameter membership functions used. In particular, it is designed to measure the loop current i and the buffer voltage u, which is indicated in FIG. 1 by the two arrows pointing to the controller 5. Further, the controller 5 is designed for communication, on the one hand, with the current loop interface 4 and, on the other hand, with the measuring unit 6, which is indicated in FIG. 1 by the double arrows. In particular, the controller 5 is designed to communicate via the current loop interface 4 and to control the measuring unit 6.

Figure 3:
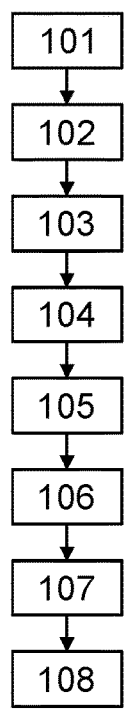
FIG. 3 illustrates a flowchart of an embodiment of a method for operating the measuring device.

The controller 5 is designed to carry out the following method steps, see FIG. 3, and does carry them out since the measuring device 1 is in operation:

In a first method step 101, a first buffer voltage $u_1=15$ V and a loop current i=10 mA are measured at a first time $t_1=1$ s.

In a second method step 102, a second buffer voltage $u_2=14.925$ V is measured at a second time $t_2=0.85$ s. In the present case, $t_2$ lies temporally before t1 and is also referred to as the execution time.

In a third method step 103, the voltage membership degree $Z_u=1$ of the first buffer voltage $u_1=15$ V is determined using the voltage membership function.

In a fourth method step 104, the current membership degree $Z_i=1$ of the loop current i=10 mA is determined using the current membership function.

In a fifth method step 105, a time distance $\Delta t=0.15$ s between the first time $t_1=1$ s and the second time $t_2=0.85$ s is determined, and the time distance membership degree $Z_t=0.7$ of the time distance $\Delta t$ is determined using the time distance membership function.

In a sixth method step 106, a differential voltage $\Delta u=0.075$ V between the first buffer voltage $u_1=15$ V and the second buffer voltage $u_2=14.925$ V is determined and a voltage slope u/s=0.5 V/s is determined by forming a quotient of the differential voltage $\Delta u$ and the time distance $\Delta t$. Further, the voltage slope membership degree $Z_{us}=0.5$ of the voltage slope u/s is determined using the voltage slope membership function.

In a seventh method step 107, a result membership degree $Z_e$ is determined by combining the voltage membership degree, the current membership degree, the time distance membership degree, and the voltage slope membership degree. The combination is carried out by multiplying the individual degrees of membership. Thus: $Z_e=Z_u \cdot Z_i \cdot Z_t \cdot Z_u = 1 \cdot 1 \cdot 0.7 \cdot 0.5 = 0.35$ In an eighth method step 108, a further method step executable by the measuring device 1 is determined by the controller 5 using the result membership degree $Z_e$, which requires no more than an available energy for a duration of an execution of the method step. For this, in this embodiment, a first limit value of 0.8 and a second limit value of 0.3 are stored in the controller 5.

Namely, when the result membership degree $Z_e$ is greater than the first limit value, the controller 5 selects a measurement executable by the measuring unit 6 as further method step, and when the result membership degree $Z_e$ is smaller than the first limit value and greater than the second limit value, the controller selects a communication executable by the current loop interface 4 via the current loop interface 4 as the further method step. If the result membership degree $Z_e=0$, then a zero step is executed as the further method step.

In the present case, the result membership value is $Z_e=0.35$, which is smaller than the first limit value and larger than the second limit value, and therefore the further method step is an executable communication. This requires less energy for execution than is available, which ensures operational reliability.

The invention claimed is:

1. A method for operating a measuring device, wherein the measuring device has a supply device with a buffer storage and, as loads, a current loop interface, a controller and a measuring unit, wherein the current loop interface is connected to a current loop and is designed for communication via the current loop, wherein the supply device is supplied with energy from the current loop and the loads are supplied with energy from the supply device using the buffer storage, comprising:
    storing a voltage membership function is stored in the controller, which assigns a buffer voltage of the buffer storage a voltage membership degree to a voltage fuzzy set of sufficient buffer voltages;
    storing at least one operating parameter membership function in the controller, which assigns an operating parameter value of the measuring device an operating parameter membership degree to an operating parameter fuzzy set of sufficient operating parameter values;
    determining at least one operating parameter value by the controller and measuring a first buffer voltage at a first time;
    executing a fuzzy algorithm having the following method steps by the controller:
        determining the voltage membership degree of the first buffer voltage using the voltage membership function;
        determining the at least one operating parameter membership degree of the at least one operating parameter value using the at least one operating parameter membership function;
        determining a result membership degree by combining the voltage membership degree and the operating parameter membership degree with each other; and
    using the result membership degree, determining a further method step which is executed by the measuring device and which requires no more than an available energy for a duration of an execution of the method step.

2. The method according to claim 1, wherein the at least one further operating parameter membership function is a current membership function which assigns a loop current of the current loop a current membership degree to a current fuzzy set of sufficient loop currents; and
    wherein a loop current is determined by the controller at the first time as the operating parameter value.

3. The method according to claim 2, wherein the loop current is determined by measuring it or by reading a setpoint current.

4. The method according to claim 1, wherein the at least one further operating parameter membership function is a time-distance membership function which assigns a time distance a time-distance membership degree to a time-distance fuzzy set of sufficient time distances;
    wherein a method step is carried out by the measuring device ending or starting at an execution time before the first time, a communication is carried out by the current interface or a measurement is made by the measuring unit; and wherein a time distance between the first time and the execution time is determined by the controller as the operating parameter value.

5. The method according to claim 1, wherein the at least one further operating parameter membership function is a voltage slope membership function which assigns a voltage slope a voltage slope membership degree to a voltage slope fuzzy set of sufficient voltage slopes; and wherein a second buffer voltage is measured by the controller at a second time and a voltage slope between the first time and the second time is determined from the first buffer voltage and the second buffer voltage as the operating parameter value.

6. The method according to claim 1, wherein the at least one further operating parameter membership function is a current slope membership function which assigns a current slope a current slope membership degree to a current slope fuzzy set of sufficient current slopes,; and wherein a first loop current at the first time and a second loop current at a second time is determined by the controller and a current slope between the first time and the second time is determined from the first loop current and from the second loop current as the operating parameter value.

7. The method according to claim 6, wherein the first loop current and the second loop current are determined by measuring them or by selecting setpoint currents.

8. The method according to claim 1, wherein the combining includes at least one multiplication.

9. The method according to claim 1, wherein, in respect to the controller, if the result membership degree is greater than a first limit value, the further method step is a measurement or diagnostic or consuming algorithm executable by the measuring unit; and wherein, if the result membership degree is less than the first limit value and greater than a second limit value, the further method step is a communication executable by the current loop interface.

10. The method according to claim 1, wherein, in respect to the controller, if the result membership degree is zero, the further method step is a zero step.

11. A measuring device, comprising:

a supply device with a buffer storage and loads including a current loop interface, a controller, and a measuring unit;

wherein the current loop interface is designed for connection to a current loop and for communication via the current loop;

wherein the supply device is designed for being supplied with energy from the current loop and for supplying energy to the loads using the buffer storage;

wherein a voltage membership function is stored in the controller, which assigns a buffer voltage of the buffer storage a voltage membership degree to a voltage fuzzy set of sufficient buffer voltages;

wherein at least one operating parameter membership function is stored in the controller, which assigns an operating parameter value of the measuring device an operating parameter membership degree to an operating parameter fuzzy set of sufficient operating parameter values;

wherein the controller is designed to determine at least one operating parameter value and to measure a first buffer voltage at a first time;

wherein the controller is designed to carry out a fuzzy algorithm having the following method steps:

determining the voltage membership degree of the first buffer voltage using the voltage membership function;

determining the at least one operating parameter membership degree of the at least one operating parameter value using the at least one operating parameter membership function;

determining a result membership degree by combining the voltage membership degree and the at least one operating parameter membership degree with each other; and wherein, using the result membership degree, the controller is designed to determine a further method step which can be is executed by the measuring device and which requires no more than an available energy for a duration of an execution of the method step.

12. The measuring device according to claim 11, the controller is designed such that at least one of:

the at least one further operating parameter membership function is a current membership function which assigns a loop current of the current loop a current membership degree to a current fuzzy set of sufficient loop currents, and a loop current is determined by the controller at the first time as the operating parameter value;

the loop current is determined by measuring it or by reading a setpoint current;

the at least one further operating parameter membership function is a time-distance membership function which assigns a time distance a time-distance membership degree to a time-distance fuzzy set of sufficient time distances, a method step is carried out by the measuring device ending or starting at an execution time before the first time, a communication is carried out by the current interface or a measurement is made by the measuring unit, and a time distance between the first time and the execution time is determined by the controller as the operating parameter value;

the at least one further operating parameter membership function is a voltage slope membership function which assigns a voltage slope a voltage slope membership degree to a voltage slope fuzzy set of sufficient voltage slopes, and a second buffer voltage is measured by the controller at a second time and a voltage slope between the first time and the second time is determined from the first buffer voltage and the second buffer voltage as the operating parameter value;

the at least one further operating parameter membership function is a current slope membership function which assigns a current slope a current slope membership degree to a current slope fuzzy set of sufficient current slopes, and a first loop current at the first time and a second loop current at a second time is determined by the controller and a current slope between the first time and the second time is determined from the first loop current and from the second loop current as the operating parameter value;

the first loop current and the second loop current are determined by measuring them or by selecting setpoint currents;

the combining includes at least one multiplication;

in respect to the controller, if the result membership degree is greater than a first limit value, the further method step is a measurement or diagnostic or consuming algorithm executable by the measuring unit, and, if the result membership degree is less than the first limit value and greater than a second limit value, the further method step is a communication executable by the current loop interface; and in respect to the controller, if the result membership degree is zero, the further method step is a zero step.

13. The measuring device according to claim 11 wherein the current loop interface is designed for communication according to a 4 mA to 20 mA standard via the current loop.

14. The measuring device according to *claim 11, wherein the current loop interface is designed for communication according to a digital bus protocol via the current loop, a HART standard, and/or according to a Bluetooth standard via an additional transceiver in the current loop interface.

15. The measuring device according to claim 11, wherein the buffer storage is a capacitor.

16. The measuring device according to claim 15, wherein the measuring device is a radar fill level measuring device.

* * * * *